(12) United States Patent
Knauft et al.

(10) Patent No.: US 8,755,808 B2
(45) Date of Patent: Jun. 17, 2014

(54) METHOD AND APPARATUS FOR PAGING POLICY ADAPTATION IN A WIRELESS NETWORK

(71) Applicants: James P Knauft, Warrenville, IL (US); Mrinmoy Bhattacharjee, Aurora, IL (US); Barrett Denton Milliken, Evanston, IL (US); Gordon Milliken, North Aurora, IL (US); Keith R Stanley, Warrenville, IL (US)

(72) Inventors: James P Knauft, Warrenville, IL (US); Mrinmoy Bhattacharjee, Aurora, IL (US); Barrett Denton Milliken, Evanston, IL (US); Gordon Milliken, North Aurora, IL (US); Keith R Stanley, Warrenville, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/630,299

(22) Filed: Sep. 28, 2012

(65) Prior Publication Data

US 2014/0094201 A1    Apr. 3, 2014

(51) Int. Cl.
H04W 88/02    (2009.01)

(52) U.S. Cl.
USPC ............................................. 455/450

(58) Field of Classification Search
USPC ........................ 455/450, 458, 226.1
See application file for complete search history.

(56) References Cited

U.S. PATENT DOCUMENTS

| 7,480,510 | B1 | 1/2009 | Woleben et al. |
| 2006/0270422 | A1 | 11/2006 | Benco et al. |
| 2011/0171979 | A1* | 7/2011 | Rune .............................. 455/458 |
| 2012/0264443 | A1* | 10/2012 | Ng et al. ........................ 455/450 |
| 2013/0017797 | A1* | 1/2013 | Ramasamy et al. ........ 455/226.1 |

OTHER PUBLICATIONS

PCT/US2013/061664 "Notification of Transmittal of the International Search Report and the Written Opinion of the International Searching Authority or the Declaration" dated Dec. 5, 2013.

* cited by examiner

Primary Examiner — Diane Mizrahi
(74) Attorney, Agent, or Firm — J. K. Jacobs (57) ABSTRACT

Various methods and devices are provided to address the need to mitigate the effects of an overload and/or prevent an overload from cascading. In one method, devices are paged (101) according to a first paging policy regarding paging attempts. It is then determined (102) that a reduced availability condition exists for network equipment supporting the first paging policy. While this reduced availability condition exists, user equipment is paged (103) according to an adapted paging policy which is more limited in paging attempts than the first paging policy.

11 Claims, 6 Drawing Sheets

METHOD AND APPARATUS FOR PAGING POLICY ADAPTATION IN A WIRELESS NETWORK

FIELD OF THE INVENTION

The present invention relates generally to communications and, in particular, to paging in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Wireless networks, such as 3GPP Long Term Evolution (LTE) networks, service mobile users and thus certain network nodes (e.g., eNodeBs) can experience extreme service demands at different times. For example, a network node serving a football stadium can become overloaded during events when users make service requests at roughly the same time. Paging traffic, in particular, can experience spikes that can overload not just a single network node but neighboring nodes as well. Thus, new solutions and techniques that are able to mitigate the effects of an overload and/or prevent an overload from cascading would meet a need and advance wireless communications generally.

Specific embodiments of the present invention are disclosed below with reference to FIGS. 1-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY

Various methods and devices are provided to address the need to mitigate the effects of an overload and/or prevent an overload from cascading. In one method, devices are paged according to a first paging policy regarding paging attempts. It is then determined that a reduced availability condition exists for network equipment supporting the first paging policy. While this reduced availability condition exists, user equipment is paged according to an adapted paging policy which is more limited in paging attempts than the first paging policy. An article of manufacture is also provided, the article comprising a processor-readable storage medium storing one or more software programs which when executed by one or more processors performs the steps of this method.

Many embodiments are provided in which the method above is modified. For example, in many embodiments determining that a reduced availability condition exists for the primary network equipment supporting the first paging policy involves detecting that the link for a network node is out-of-service, a page request rate for a network node is above a request rate threshold or a page completion rate for a network node is below a completion rate threshold. Examples of primary network equipment that support the first paging policy include the mobility management entity (MME) and the network node that last served the UE.

In many embodiments, determining that a reduced availability condition exists for primary network equipment supporting the first paging policy involves determining that a network node supporting the first paging policy is out-of-service. In such embodiments, paging the UE according to an adapted paging policy may involve making no attempt to page the UE at any network node when the UE was last seen at the out-of-service network node.

In many embodiments, determining that a reduced availability condition exists for the primary network equipment supporting the first paging policy involves determining that a network node supporting the first paging policy is overloaded. In such embodiments, paging the UE according to an adapted paging policy may involve making one page attempt to page the UE at the overloaded network node and making no additional attempts to page the UE at any other network nodes, when the UE was last seen at the overloaded network node, and may involve making at least one page attempt to page the UE while excepting the overloaded network node from the at least one page attempt, when the UE was not last seen at the overloaded network node.

In many embodiments, determining that a reduced availability condition exists for primary network equipment supporting the first paging policy involves determining that a mobility management entity (MME) supporting the first paging policy is overloaded. In such embodiments, paging the UE according to an adapted paging policy may involve only paging the UE at a network node where the UE was last seen.

A network equipment apparatus is also provided. The network equipment being configured to communicate with other equipment in the system and being operative to page devices according to a first paging policy regarding paging attempts and then to determine that a reduced availability condition exists for network equipment supporting the first paging policy. The network equipment also being configured to page a UE according to an adapted paging policy while the reduced availability condition exists, wherein the adapted paging policy is more limited in paging attempts than the first paging policy. In some embodiments, the network equipment is, or includes, a mobility management entity (MME). Many embodiments are provided in which this network equipment apparatus is modified. Examples of such embodiments can be found described above with respect to the methods.

DETAILED DESCRIPTION OF EMBODIMENTS

Existing methods of overload control generally focus on protecting each network element by rejecting attempts by new users to attach to the network. However, this approach does not protect network equipment, such as a mobility management entity or network nodes, from spikes in paging traffic from users that are already attached to the network. It also does not provide any means to prevent problems on individual network nodes from causing additional paging traffic on neighboring network nodes and potentially driving those neighboring network nodes into overload.

Figure 1:
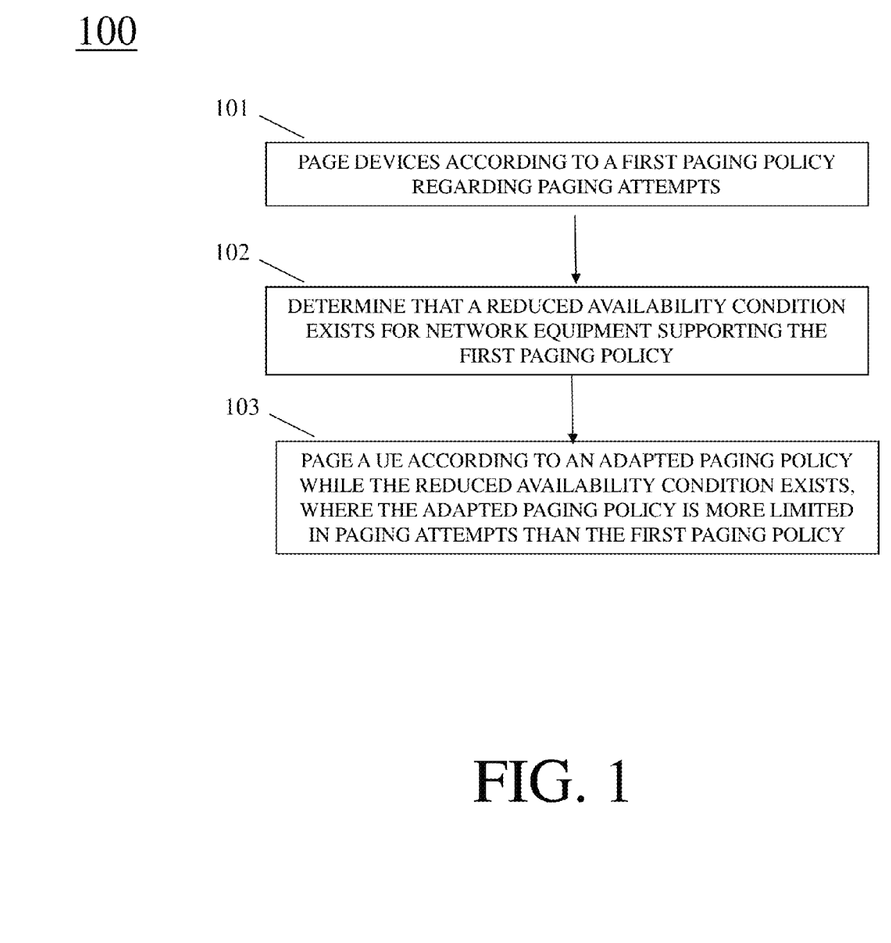
FIG. 1 is a logic flow diagram of functionality performed by network equipment in accordance with various embodiments of the present invention.

Aspects of embodiments of the present invention can be understood with reference to FIGS. 1-4. Diagram 100 of FIG. 1 is a logic flow diagram of functionality performed by network equipment in accordance with various embodiments of the present invention. In the method depicted in diagram 100, devices are paged (101) according to a first paging policy regarding paging attempts. It is then determined (102) that a reduced availability condition exists for network equipment supporting the first paging policy. While this reduced availability condition exists, user equipment is paged (103) according to an adapted paging policy which is more limited in paging attempts than the first paging policy. By reducing the scope of paging, when network equipment is experiencing some sort of reduced availability (for example, being out-of-service or being overloaded), the effects of the overload/outage can be mitigated in spite of all of the users that are already attached to the network.

Initially, devices are paged according to a first paging policy regarding paging attempts. While different paging policies may be employed, typically a paging policy that involves escalation is used. For example, when a device does not respond to a page, the paging area is expanded from a network node to a tracking area (or perhaps multiple tracking areas). Depending on the embodiment, determining that a reduced availability condition exists for network equipment supporting the first paging policy may involve monitoring S1 links to detect any outages, monitoring page request rates for network nodes to detect any that are above a request rate threshold, and/or monitoring page completion rates for network nodes to detect any that are below a completion rate threshold. Either or both of these thresholds, the request rate threshold or the completion rate threshold, may be configured by a network operator.

Figure 2:
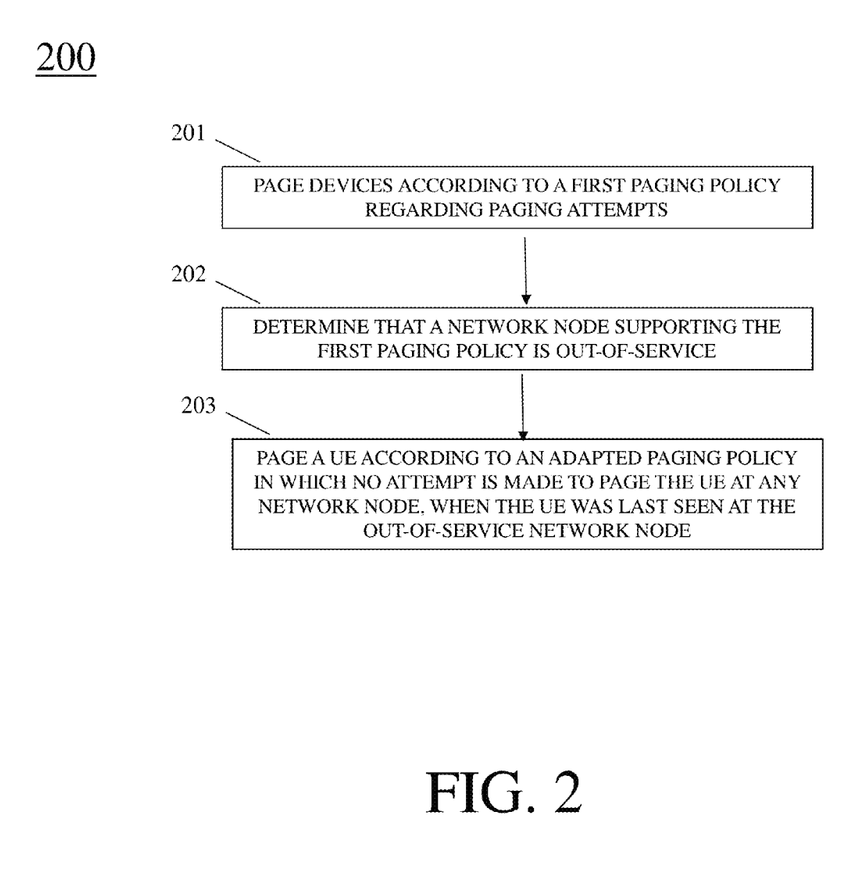
FIG. 2 is a logic flow diagram of functionality performed by network equipment in accordance with some embodiments of the present invention.
Figure 3:
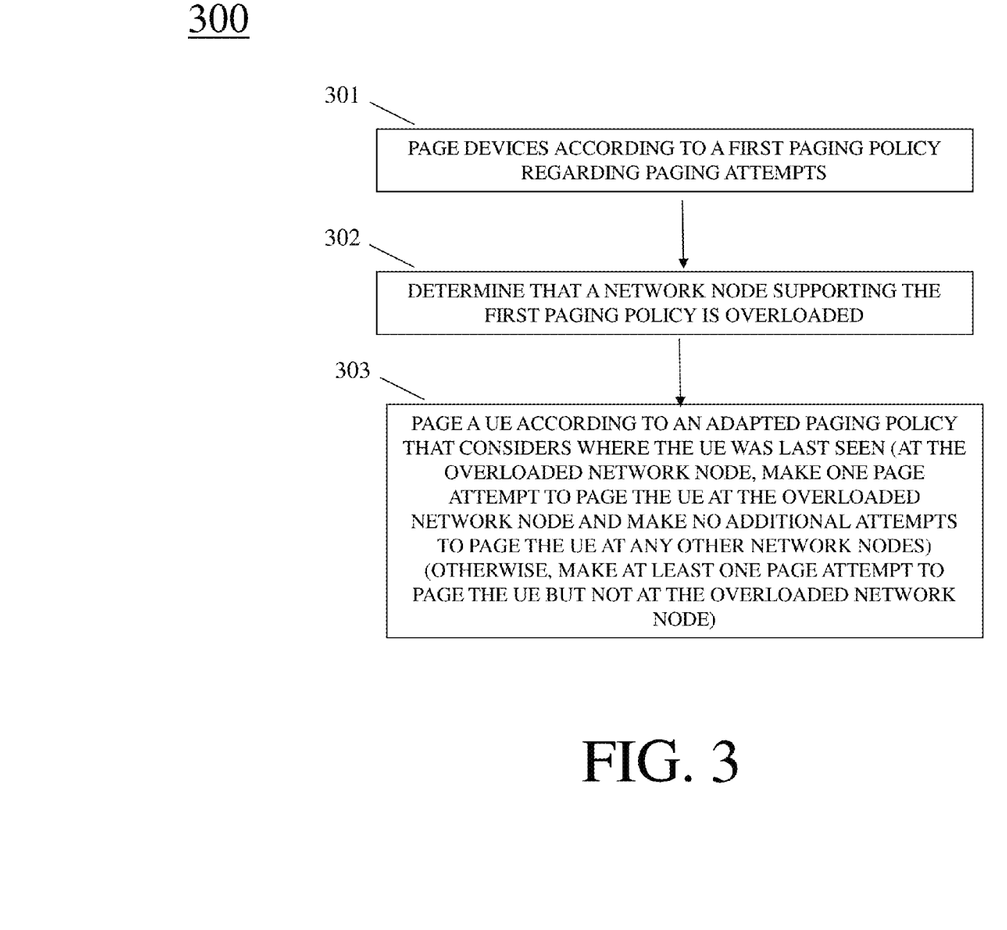
FIG. 3 is a logic flow diagram of functionality performed by network equipment in accordance with some embodiments of the present invention.
Figure 4:
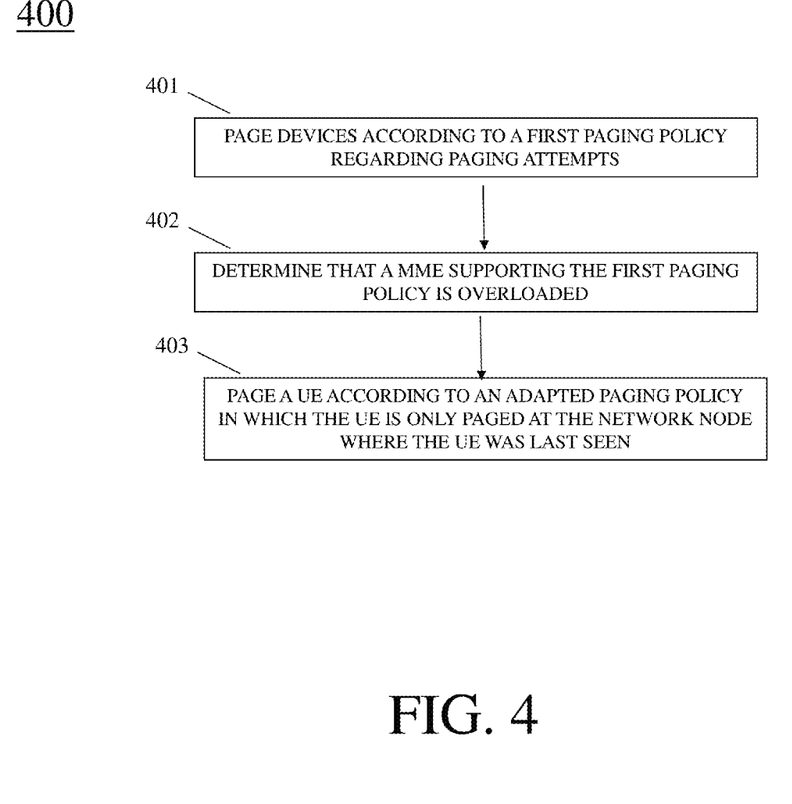
FIG. 4 is a logic flow diagram of functionality performed by network equipment in accordance with some embodiments of the present invention.

Many embodiments are provided in which the method above is modified. Some of these are illustrated in FIGS. 2-4. In the method depicted in diagram 200, devices are paged (201) according to a first paging policy regarding paging attempts. It is then determined (202) that a network node supporting the first paging policy is out-of-service. While this out-of-service condition exists, user equipment is paged (203) according to an adapted paging policy in which no attempt is made to page the UE at any network node, when the UE was last seen at the out-of-service network node.

In the method depicted in diagram 300, devices are paged (301) according to a first paging policy regarding paging attempts. It is then determined (302) that a network node supporting the first paging policy is overloaded. While this overloaded condition exists, user equipment is paged (303) according to an adapted paging policy that considers where the UE was last seen. If the UE was last seen at the overloaded network node, one page attempt is made to page the UE at the overloaded network node and no additional attempts are made to page the UE at any other network nodes. If the UE was not last seen at the overloaded network node, at least one page attempt is made to page the UE but not at the overloaded network node, which is excluded from all attempts.

In the method depicted in diagram 400, devices are paged (401) according to a first paging policy regarding paging attempts. It is then determined (402) that a mobility management entity (MME) supporting the first paging policy is overloaded. While this overloaded condition exists, user equipment is paged (403) according to an adapted paging policy in which the user equipment is only paged at the network node where the UE was last seen.

Figure 5:
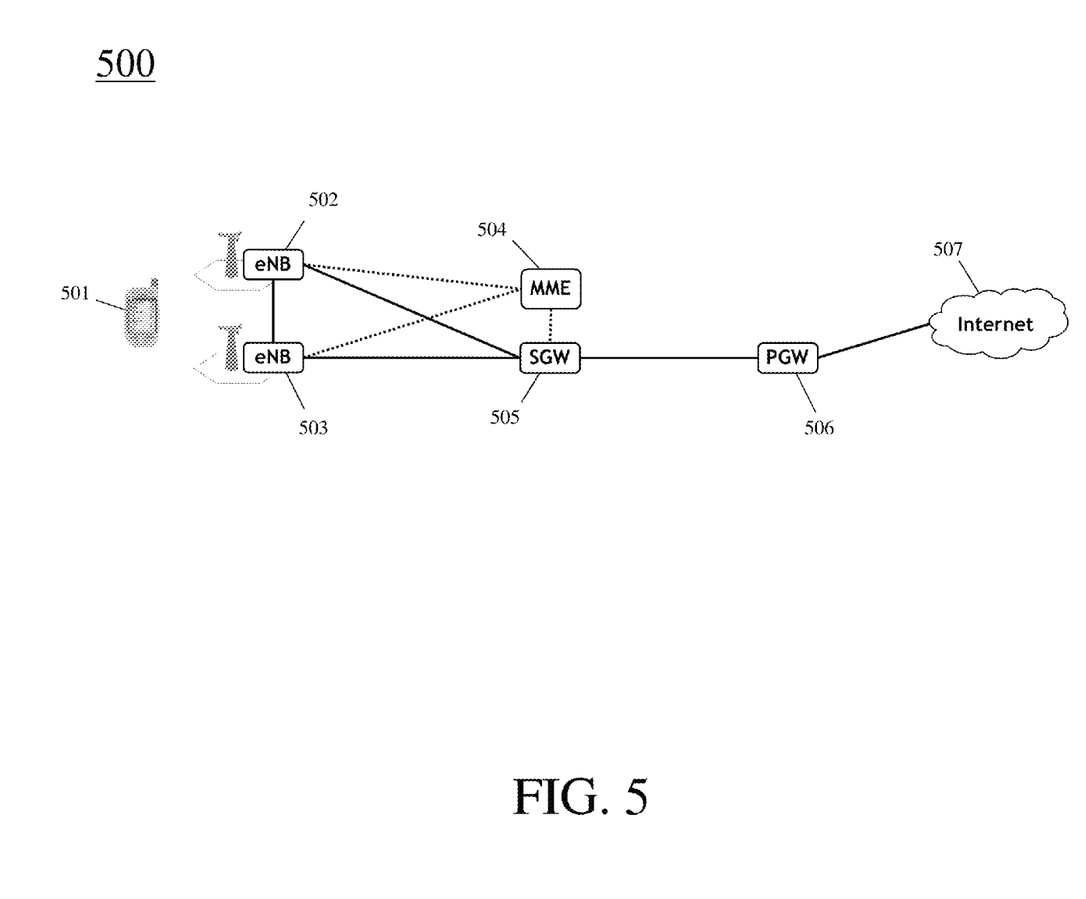
FIG. 5 is a block diagram depiction of network equipment and user equipment in accordance with various embodiments of the present invention.
Figure 6:
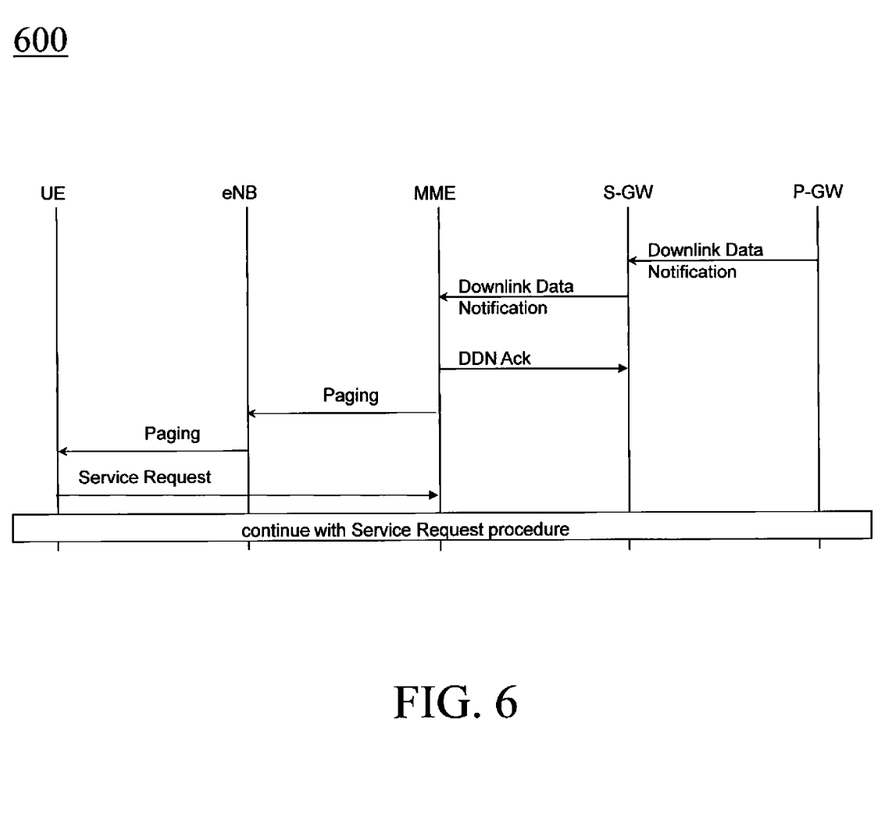
FIG. 6 is a messaging flow diagram depicting a paging procedure, in accordance with certain embodiments of the present invention.

To provide a greater degree of detail in making and using various aspects of the present invention, a description of our approach to paging and a description of certain, quite specific, embodiments follows for the sake of example. FIGS. 5 and 6 are referenced to illustrate an example of a specific system in which the present invention may be embodied.

FIG. 5 is a block diagram depiction of network equipment and user equipment in accordance with various embodiments of the present invention. The system depicted in diagram 500 includes an LTE wireless network providing service to mobile device (or UE) 501 via network nodes (or eNBs) 502 and 503. Also depicted is Mobility Management Entity (MME) 504, Serving Gateway (SGW) 505, and Packet Gateway (PGW) 506, connected to internet 507.

FIG. 6 is a messaging flow diagram depicting a paging procedure, in accordance with certain embodiments of the present invention. The paging procedure depicted in diagram 600 is initiated by the MME to establish a signaling connection to the UE when a Downlink Data Notification (DDN) is received from the Serving Gateway (SGW). This message indicates that data packets need to be delivered to the UE. Paging is part of the Network Triggered Service Request procedure as follows.

The MME sends a Page message to one or more eNodeBs. The set of eNodeBs that are sent Page messages is based upon the current paging method and the last known location of the UE (for example, page all eNodeBs in the last seen tracking area).

eNodeBs then page the UE. When a UE receives the Page message, a Network Triggered Service Request Procedure is initiated, and the UE responds with a Service Request. For details about each step of this example paging procedure, one may refer to 3GPP Technical Specification 23.401.

The MME paging escalation scheme (or policy) causes the MME to page entire tracking areas (or multiple tracking areas) multiple times when a UE does not respond to pages. When eNBs are operating normally, this paging escalation scheme has the key benefit of maximizing the paging success rate. However, if the initial page attempts are actually failing because the eNB failed to page due to a paging channel resource shortage or an eNB overload condition, the paging escalation scheme will cause additional paging traffic for the eNB and other eNBs in the same tracking area.

Since paging messages initiated by an MME comprise a significant portion of the signaling traffic involving the eNodeBs (i.e., base stations) on an LTE network, there is a need to adjust the MMEs paging behavior when overload conditions arise on the MME or when individual eNodeBs are under stress. Failure to adjust the MMEs paging behavior will limit the MMEs ability to mitigate the effects of an overload and/or may cause problems with individual eNodeBs to cascade to neighboring eNodeBs.

When an overload condition (e.g., an overload alarm has been raised) is detected by the MME, the MME should take actions to prevent worsening of the overload condition by paging less aggressively than the standard paging policy in which multiple page attempts are made to reach an individual UE and the area in which the UE is paged is increased for each page attempt. Under overload conditions, the MME should instead adopt a streamlined paging policy in which only a single page attempt is made and the UE is only paged at the eNodeB where the UE was last seen. Adoption of this streamlined paging policy substantially reduces the overall paging traffic on the network with only a minor reduction in the page completion rate (e.g., 85% versus 93%). Although the MME normally attempts to maximize the page completion rate, the negative effects of a major overload are so severe that this type of tradeoff to avoid worsening of an overload condition is appropriate.

It is also desirable to adjust the MME's paging policy when individual eNodeBs are encountering issues such as: the S1 link for an eNodeB is out of service, the page request rate for an eNodeB has spiked to an unusually high level, or the page completion rate for an eNodeB has dropped to an unacceptable level. The normal paging policy used by the MME pages a UE in an increasingly wider service area if a UE fails to respond to page requests. Under normal conditions, this is an efficient and effective strategy for reaching the UE. However, the eNodeB response to a paging overload is to drop excessive pages. As a result of this discard policy, paging of the 'last seen eNodeB' may fail to reach a UE which is in the eNodeB coverage area, the MME will then page the UE in all of the eNodeBs within the 'last seen tracking area'. Consequently, having one or more eNodeBs that repeatedly fail to successfully page UEs within their service area will result in all of the other eNodeBs in the same tracking area to receive a significantly higher level of paging traffic.

This higher level of paging traffic could cause the other eNodeBs in the tracking area to also have difficultly in servicing page requests and further increase paging traffic on the other eNodeBs. In the worst case, this cascading effect could cause all of the eNodeBs in a tracking area to go into overload and cause a major service outage in the LTE network. In order to prevent overloading of neighboring eNodeBs, the MME will monitor the S1 link state, the paging request rate, the page completion rate, and other measures of stress on individual eNodeBs.

If the MME determines that one or more eNodeBs are under major stress or are out-of-service, the MME will adjust its paging policy as follows:
- If the MME needs to page a UE that was last seen on a eNodeB that is out-of-service, then paging of that UE is skipped since the odds of finding that UE outside of the last seen eNodeB does not justify the increased paging traffic load on neighboring eNodeBs.
- If the MME needs to page a UE that was last seen on an eNodeB that is under major stress, then only a single page attempt on the last seen eNodeB is performed by the MME. Neighboring eNodeBs will not ever be paged in this case.
- If the MME needs to page a UE that was last seen on an eNodeB that is not under major stress, then the paging policy will be adjusted to avoid sending any pages to eNodeBs that are currently under major stress. The eNodeBs under major stress are filtered out of any list of eNodeBs to be paged since the odds of finding the UE within the service area of that eNodeB does not justify the increased paging load on an eNodeB that is already under major stress.

Real time metrics gathered for support of the adaptation of paging policy for overload control may also be made available for monitoring of the current health of the LTE network by service technicians.

Some example situations are described below in which this adapted paging approach may be engaged. In a first situation, the entire LTE network is under heavy call traffic load on New Year's Eve. As the time approaches midnight, a large spike of SMS traffic hits the network and the incoming SMS messages trigger a significantly higher than normal level of paging traffic. Due to these factors, the MME is forced into an overload condition. The overload condition causes the 'adaptive paging for overload control feature' to be engaged. The MME switches to the less aggressive paging policy of only making a single page attempt to reach a UE and only paging that UE on its last seen eNodeB. As a result, the paging traffic level drops significantly. Each Download Data Notification (DDN) request from the Service Gateway (i.e., the normal event that triggers paging by the MME) normally results in the average of 10 page messages. Given the adoption of a less aggressive paging policy while the MME is in overload, the average number of page messages per DDN drops to 1. This reduction in paging traffic should make a major contribution in avoiding a worsening of the overload condition.

In a second situation, an eNodeB serving a football stadium is currently handling a far higher call traffic load than is typical. Unfortunately, the eNodeB is unable to handle the call traffic load and the vast majority of page request messages are dropped. Neighboring eNodeBs are near maximum capacity, but are operating normally. The MME detects that the eNodeB serving the football stadium is under major stress since the page completion rate drops below 10%. The detection of the eNodeB under major stress causes the MME to only use one page attempt of the last seen eNodeB for any UE that was last seen on the eNodeB serving the football stadium. Furthermore, the MME does not include the eNodeB serving the football stadium when trying to reach UEs that were last seen in other eNodeBs within that same tracking area. As a result, the neighboring eNodeBs are not overloaded with page requests for UEs served by the eNodeB under stress. In addition, the paging traffic load on the eNodeB under stress should be reduced, since it will not receive page requests for UEs that were last seen in neighboring eNodeBs.

This adapted paging approach addresses the need for adjusting paging behavior in an LTE network to help mitigate the effects of overload on both the MME and the eNodeBs that are associated with the MME.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for paging policy adaptation, the method comprising:
   paging devices according to a first paging policy regarding paging attempts;
   determining that a reduced availability condition exists for network equipment supporting the first paging policy;
   paging a UE (user equipment) according to an adapted paging policy while the reduced availability condition exists, wherein the adapted paging policy is more limited in paging attempts than the first paging policy;
   wherein determining that a reduced availability condition exists for network equipment supporting the first paging policy comprises determining that a network node supporting the first paging policy is overloaded;
   wherein paging the UE according to an adapted paging policy comprises at least one of
      when the UE was last seen at the overloaded network node, making one page attempt to page the UE at the overloaded network node and making no additional attempts to page the UE at any other network nodes or
      when the UE was not last seen at the overloaded network node, making at least one page attempt to page the UE while excepting the overloaded network node from the at least one page attempt.

2. The method as recited in claim 1, wherein determining that a reduced availability condition exists for network equipment supporting the first paging policy comprises
   determining that a network node supporting the first paging policy is out-of-service.

3. The method as recited in claim 2, wherein paging the UE according to an adapted paging policy comprises
   when the UE was last seen at the out-of-service network node, making no attempt to page the UE at any network node.

4. A method for paging policy adaptation, the method comprising:
   paging devices according to a first paging policy regarding paging attempts;
   determining that a reduced availability condition exists for network equipment supporting the first paging policy;
   paging a UE (user equipment) according to an adapted paging policy while the reduced availability condition exists, wherein the adapted paging policy is more limited in paging attempts than the first paging policy,
   wherein determining that a reduced availability condition exists for network equipment supporting the first paging policy comprises determining that a mobility management entity (MME) supporting the first paging policy is overloaded,
   wherein paging the UE according to an adapted paging policy comprises only paging the UE at a network node where the UE was last seen.

5. A method for paging policy adaptation, the method comprising:
   paging devices according to a first paging policy regarding paging attempts;
   determining that a reduced availability condition exists for network equipment supporting the first paging policy;
   paging a UE (user equipment) according to an adapted paging policy while the reduced availability condition exists, wherein the adapted paging policy is more limited in paging attempts than the first paging policy,
   wherein determining that a reduced availability condition exists for network equipment supporting the first paging policy comprises
   detecting the occurrence of at least one of
      a page request rate for a network node is above a request rate threshold, or
      a page completion rate for a network node is below a completion rate threshold.

6. Network equipment in a communication system, the network equipment being configured to communicate with other equipment in the system, wherein the network equipment is operative
   to page devices according to a first paging policy regarding paging attempts, to determine that a reduced availability condition exists for network equipment supporting the first paging policy, and to page a UE (user equipment) according to an adapted paging policy while the reduced availability condition exists, wherein the adapted paging policy is more limited in paging attempts than the first paging policy, wherein being operative to determine that a reduced availability condition exists for network equipment supporting the first paging policy comprises being operative to determine that a network node supporting the first paging policy is overloaded;

wherein being operative to page the UE according to an adapted paging policy comprises at least one of being operative to make one page attempt to page the UE at the overloaded network node and being operative to make no additional attempts to page the UE at any other network nodes, when the UE was last seen at the overloaded network node or being operative to make at least one page attempt to page the UE while excepting the overloaded network node from the at least one page attempt, when the UE was not last seen at the overloaded network node.

7. The network equipment as recited in claim 6, wherein being operative to determine that a reduced availability condition exists for network equipment supporting the first paging policy comprises being operative to determine that a network node supporting the first paging policy is out-of-service.

8. The network equipment as recited in claim 7, wherein being operative to page the UE according to an adapted paging policy comprises being operative to make no attempt to page the UE at any network node when the UE was last seen at the out-of-service network node.

9. The network equipment as recited in claim 6, wherein the network equipment comprises a mobility management entity (MME).

10. Network equipment in a communication system, the network equipment being configured to communicate with other equipment in the system, wherein the network equipment is operative to page devices according to a first paging policy regarding paging attempts, to determine that a reduced availability condition exists for network equipment supporting the first paging policy, and to page a UE (user equipment) according to an adapted paging policy while the reduced availability condition exists, wherein the adapted paging policy is more limited in paging attempts than the first paging policy, wherein being operative to determine that a reduced availability condition exists for network equipment supporting the first paging policy comprises being operative to determine that a mobility management entity (MME) supporting the first paging policy is overloaded, wherein being operative to page the UE according to an adapted paging policy comprises being operative to page the UE only at a network node where the UE was last seen.

11. Network equipment in a communication system, the network equipment being configured to communicate with other equipment in the system, wherein the network equipment is operative to page devices according to a first paging policy regarding paging attempts, to determine that a reduced availability condition exists for network equipment supporting the first paging policy, and to page a UE (user equipment) according to an adapted paging policy while the reduced availability condition exists, wherein the adapted paging policy is more limited in paging attempts than the first paging policy, wherein being operative to determine that a reduced availability condition exists for network equipment supporting the first paging policy comprises being operative to detect the occurrence of at least one of a page request rate for a network node is above a request rate threshold, or a page completion rate for a network node is below a completion rate threshold.

* * * * *